United States Patent
Durbin

(12) 
(10) Patent No.: US 6,641,046 B2
(45) Date of Patent: Nov. 4, 2003

(54) READER FOR DECODING TWO-DIMENSIONAL OPTICALLY READABLE INFORMATION

(75) Inventor: Dennis A. Durbin, Cedar Rapids, IA (US)

(73) Assignee: Intermec IP Corp, Woodland Hills, CA (US)

( * ) Notice: Subject to any disclaimer, the term of this patent is extended or adjusted under 35 U.S.C. 154(b) by 0 days.

(21) Appl. No.: 09/961,697

(22) Filed: Sep. 24, 2001

(65) Prior Publication Data

US 2002/0088861 A1 Jul. 11, 2002

Related U.S. Application Data

(63) Continuation of application No. 09/170,689, filed on Oct. 13, 1998, now Pat. No. 6,330,975, which is a continuation of application No. 08/703,564, filed on Aug. 27, 1996, now Pat. No. 5,821,523, which is a continuation-in-part of application No. 08/461,605, filed on Jun. 5, 1995, now Pat. No. 5,902,988, which is a continuation of application No. 08/277,132, filed on Jul. 19, 1994, now abandoned, which is a continuation of application No. 07/919,488, filed on Jul. 27, 1992, now abandoned, which is a continuation-in-part of application No. 07/889,705, filed on May 26, 1992, now abandoned, which is a continuation-in-part of application No. 07/849,771, filed on Mar. 12, 1992, now abandoned.

(51) Int. Cl.$^7$ ................................................ G06K 7/10
(52) U.S. Cl. ............................ 235/472.01; 235/462.08
(58) Field of Search ........................ 235/472.01, 462.08

(56) References Cited

U.S. PATENT DOCUMENTS

| 3,513,320 A | 5/1970 | Weldon |
| 4,044,227 A | 8/1977 | Holm et al. |
| 4,360,798 A | 11/1982 | Swartz et al. |
| 4,369,361 A | 1/1983 | Swartz et al. |

(List continued on next page.)

FOREIGN PATENT DOCUMENTS

| EP | 0349770 | 1/1990 |
| EP | 0385478 | 9/1990 |
| EP | 0631679 | 10/1999 |
| JP | 0120388 | 5/1988 |
| JP | 63-253483 | 10/1988 |
| JP | 0100684 | 4/1989 |
| JP | 0198175 | 8/1991 |
| JP | 5-94556 | 4/1993 |
| JP | 5-174204 | 7/1993 |
| JP | 406162247 | 6/1994 |
| WO | WO 93/18478 | 9/1993 |

OTHER PUBLICATIONS

US 5,347,112, 9/1994, Durbin (withdrawn)

Mark Alpert, "Building a Better Bar Code", Jun. 15, 1992 p. 101 Fortune Magazine.

John Burnell & Mark David, "Auto. ID featured at CeBIT", Jun. 1993, vol. 2, No. 4, p. 1, Automatic I.D. News.

Hitachi Ltd., vol. 13, No. 66, p. 828, Oct. 1988.

E.R. Williams, "Two–Dimensional Image Sensor Using One–Dimensional Sensor Array", Jul. 1978, vol. 21, No. 2 pp. 436–437, IBM Technical Disclosure Bulletin.

*Primary Examiner*—Harold I. Pitts
(74) *Attorney, Agent, or Firm*—Simmons, Perrine, Albright & Ellwood, P.L.C.

(57) ABSTRACT

A reader for reading optical information is described which includes a housing for supporting a photosensitive array associated with an optical string adapted to focus optical information on the array. Also provided are array and optical string controls for controlling the array and optical string such that the output of selected images on the array may be processed via pattern recognition. Images on the array may be displayed and highlighted on a display. In this fashion a user is assisted in recognizing images of optical information incident on the array to facilitate aiming of the reader.

52 Claims, 6 Drawing Sheets

U.S. PATENT DOCUMENTS

| | | |
|---|---|---|
| 4,488,679 A | 12/1984 | Bockholt et al. |
| 4,538,060 A | 8/1985 | Sakai et al. |
| 4,734,566 A | 3/1988 | Senda et al. |
| 4,764,668 A | 8/1988 | Hayard |
| 4,786,792 A | 11/1988 | Pierce et al. |
| 4,818,856 A | 4/1989 | Matsushima et al. |
| 4,822,986 A | 4/1989 | Guthmueller et al. |
| 4,877,949 A | 10/1989 | Danielson et al. |
| 5,107,100 A | 4/1992 | Shepard et al. |
| 5,117,098 A | 5/1992 | Swartz |
| 5,124,539 A | 6/1992 | Krichever et al. |
| 5,212,371 A | 5/1993 | Boles et al. |
| 5,321,523 A | 6/1994 | Hashimoto |
| 5,331,176 A | 7/1994 | Sant Anseimo |
| 5,347,113 A | 9/1994 | Reddersen et al. |
| 5,365,050 A | 11/1994 | Worthington et al. |
| 5,371,347 A | 12/1994 | Plesko |
| 5,371,348 A | 12/1994 | Kumar et al. |
| 5,378,882 A | 1/1995 | Gong et al. |
| 5,382,779 A | 1/1995 | Gupta |
| 5,382,782 A | 1/1995 | Hasegawa et al. |
| 5,406,061 A | 4/1995 | Knight |
| 5,410,141 A | 4/1995 | Koenck et al. |
| 5,414,250 A | 5/1995 | Swartz et al. |
| 5,414,251 A | 5/1995 | Durbin |
| 5,418,684 A | 5/1995 | Koenck et al. |
| 5,466,921 A | 11/1995 | Lapinski et al. |
| 5,504,316 A | 4/1996 | Bridgelall et al. |
| 5,902,988 A | 5/1999 | Durbin |
| 6,039,258 A | 3/2000 | Durbin et al. |
| 6,164,545 A | 12/2000 | Danielson |
| 6,330,975 B1 | 12/2001 | Bunte et al. |
| 6,332,575 B1 * | 12/2001 | Schuessler et al. ...... 235/472.1 |

* cited by examiner

READER FOR DECODING TWO-DIMENSIONAL OPTICALLY READABLE INFORMATION

CROSS REFERENCE TO RELATED APPLICATIONS

The present application is a continuation of U.S. application Ser. No. 09/170,689 (Attorney Docket No. 37955AA), filed Oct. 13, 1998 now U.S. Pat. No. 6,330,975 which is a continuation of application Ser. No. 08/703,564 filed Aug. 27, 1996, now U.S. Pat. No. 5,821,523, which is a continuation-in-part of application Ser. No. 08/461,605 filed Jun. 5, 1995, now U.S. Pat. No. 5,902,988, which is a continuation of U.S. application Ser. No. 8/277,132 (Attorney Docket Nos. 37955XB and 10052US02), filed Jul. 19, 1994, now abandoned, which is itself a continuation of U.S. application Ser. No. 07/919,488 (Attorney Docket Nos. 37955XA and 92P540), filed Jul. 27, 1992, now abandoned, and (2) a continuation-in-part U.S. application Ser. No. 07/889,705 (Attorney Docket Nos. 37955X and 92P402), filed May 26, 1992, now abandoned. The U.S. application Ser. No. 07/889,705 is a continuation-in-part of the application Ser. No. 07/849,771. Application Ser. No. 08/284,883 filed Jul. 28, 1994, now U.S. Pat. No. 5,414,251 is a continuation of the application Ser. No. 07/849,771.

INCORPORATION BY REFERENCE

The previously identified patent applications in the section entitled Cross References to Related Applications which are now U.S. Pat. Nos. 5,821,523 and 5,902,988, are hereby incorporated herein by reference in their entirety.

BACKGROUND OF THE INVENTION

1. Technical Field

The present invention is directed to optical information readers and particularly to readers adapted to selectively decode two-dimensional optical information sets.

2. Description of the Prior Art

Conventional bar code symbols have small data storage capabilities. This reduces the utility of conventional bar code scanner and reader systems. For example, the 11 digit Uniform Pricing Code found on most supermarket items acts as an identifying number which may be utilized to access information in a database. Codes of this type do not carry information along their vertical axis, and are therefore, less prone to skewing errors during decoding.

Two-dimensional bar code symbols or "portable data files" have recently been developed. With codes of this type access to a database is not required since the code contains the information which would normally be keyed for in a database. Since reliance on a database is not required, information may be accessed and exchanged more readily and reliably. However, in order to decode two-dimensional codes, a more sophisticated apparatus is required. This is primarily true since normal vertical code redundancy is not present, making code registration, orientation and condition very important.

Several two-dimensional coding standards have been proposed, e.g., Code 49, 16K, Identicode MLC-2D, and Code PDF417. While such codes are capable of storing information such as price, name of product, manufacturer, weight, expiration date, inventory data, shipping information, and the like; apparatus which assist the user in aiming and decoding two-dimensional codes are not currently available. For example, two-dimensional codes might consist of a stack of conventional linear codes. Each line may contain different information, such as (1) pricing information, (2) product name, (3) name of the manufacturer, (4) product weight, (5) expiration date, (6) inventory data, (7) shipping information, and the like. Additionally, a user may require the ability to selectively store or send portions of the decoded bar code symbol.

3. Objects of the Invention

Therefore, a principal object of the present invention is to provide a reader adapted to selectively read two-dimensional optical information sets.

Another object of the present invention is to provide a reader adapted to selectively read two-dimensional optical information sets in ambient light.

Another object of the present invention is to provide a reader adapted to selectively read two-dimensional optical information sets from a wide range of distances.

Another object of the present invention is to provide a reader adapted to selectively read optical information while assisting a user in aiming the reader.

Another object of the present invention is to provide a reader adapted to selectively read two-dimensional optical information sets which is economical to manufacture and durable in use.

Another object of the present invention is to provide a reader adapted to selectively read two-dimensional optical information sets which is efficient in operation, simple in construction, easy to use and trouble free. These and other objects will be apparent to those skilled in the art from the following disclosure.

SUMMARY OF THE INVENTION

The present invention discloses a novel reader for reading optical information. In one exemplary embodiment the invention includes a housing for supporting a photosensitive array associated with an optical string means which is adapted to focus optical information on the array. Also provided are array and optical string control means for controlling the array and optical string such that the output of selected images on the array may be processed via pattern recognition means. Images on the array may be presented to the user by a display means. Images recognized to contain decodable optical information may be displayed and highlighted on the display means. In this fashion a user is assisted in aiming, recognizing and confirming the decodability of a coded image incident on the array.

BRIEF DESCRIPTION OF THE DRAWINGS

Other objects and advantages of the invention will be apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
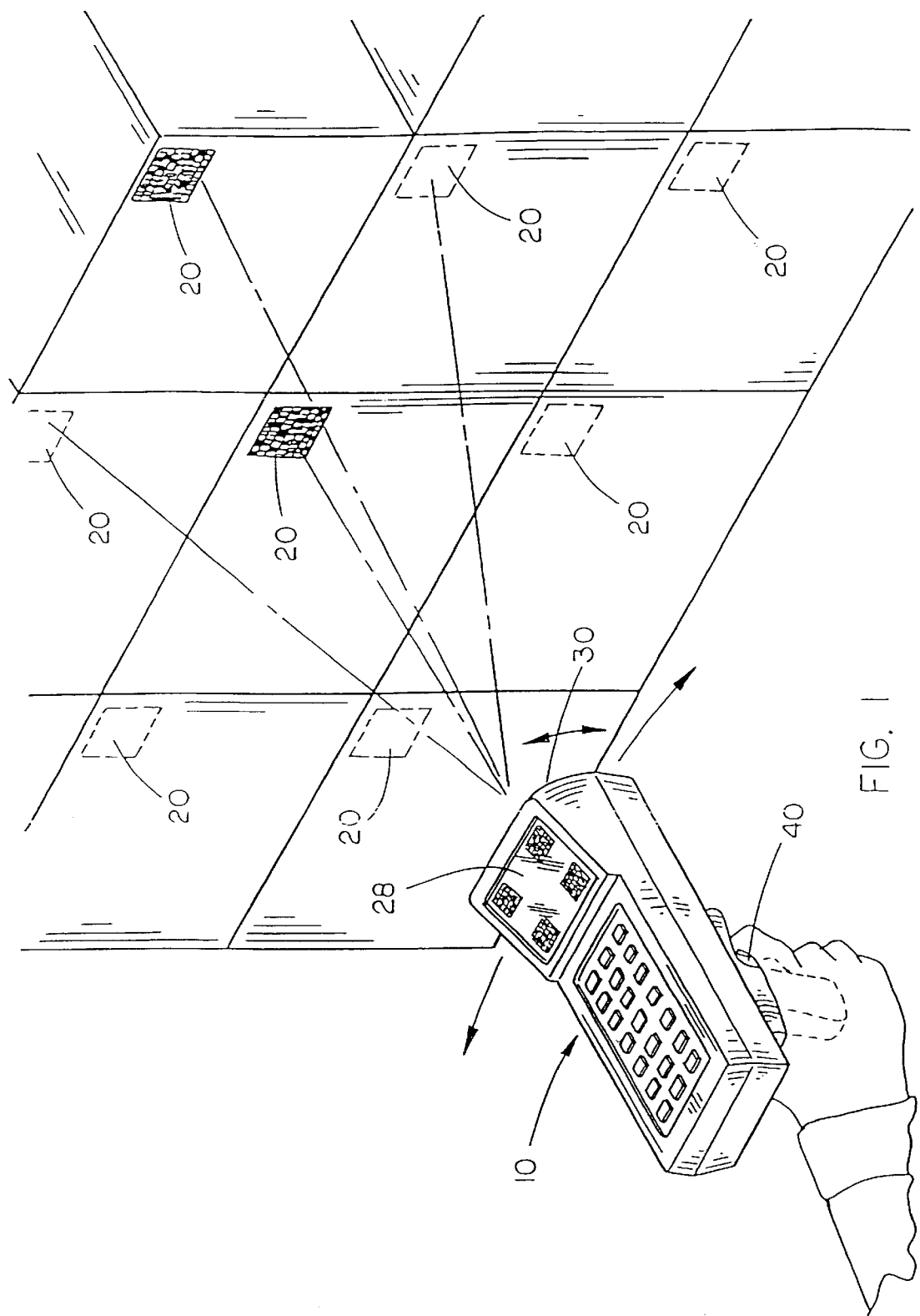
FIG. 1 is a perspective view of a preferred embodiment of the two-dimensional optical information reader showing a user being assisted by the display of the reader in aiming.
Figure 3:
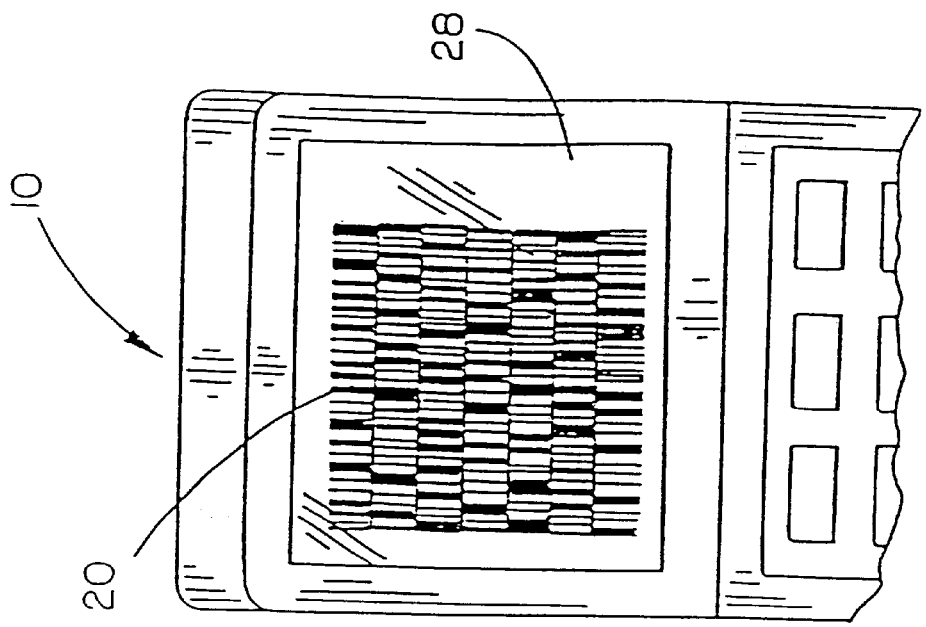
FIG. 3 is a partial top perspective view of the reader illustrating the display wherein the display indicates to a user that a two-dimensional, decodable bar code symbol is centered in view and available for reading.
Figure 2:
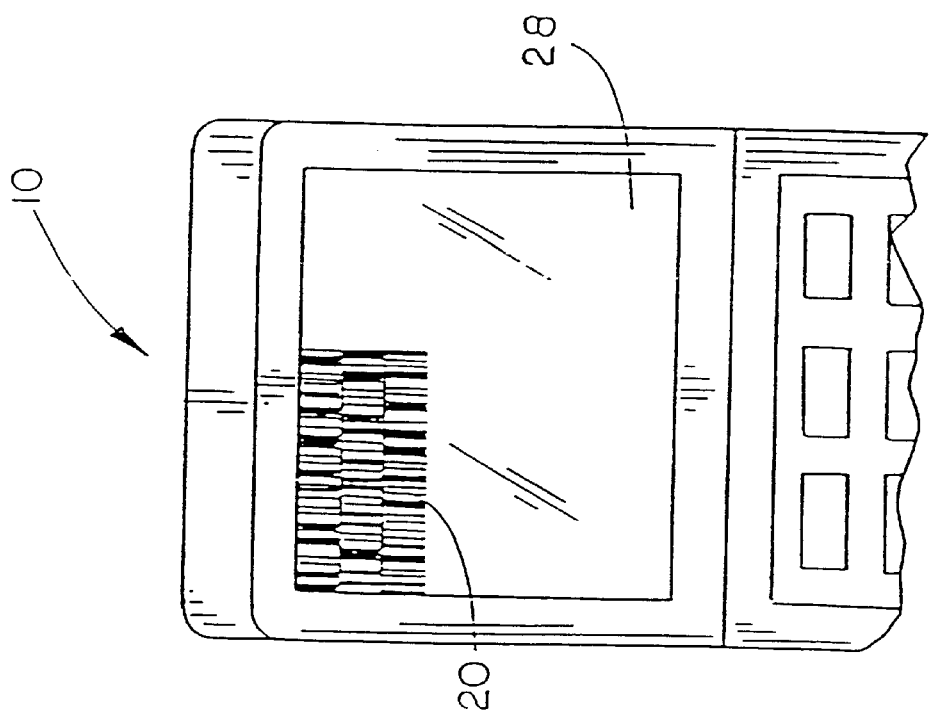
FIG. 2 is a partial top perspective view of the reader illustrating the display wherein the display indicates to a user that a two-dimensional, decodable, bar code symbol may be read if the user adjusts the aim of the reader to the left and above.
Figure 4:
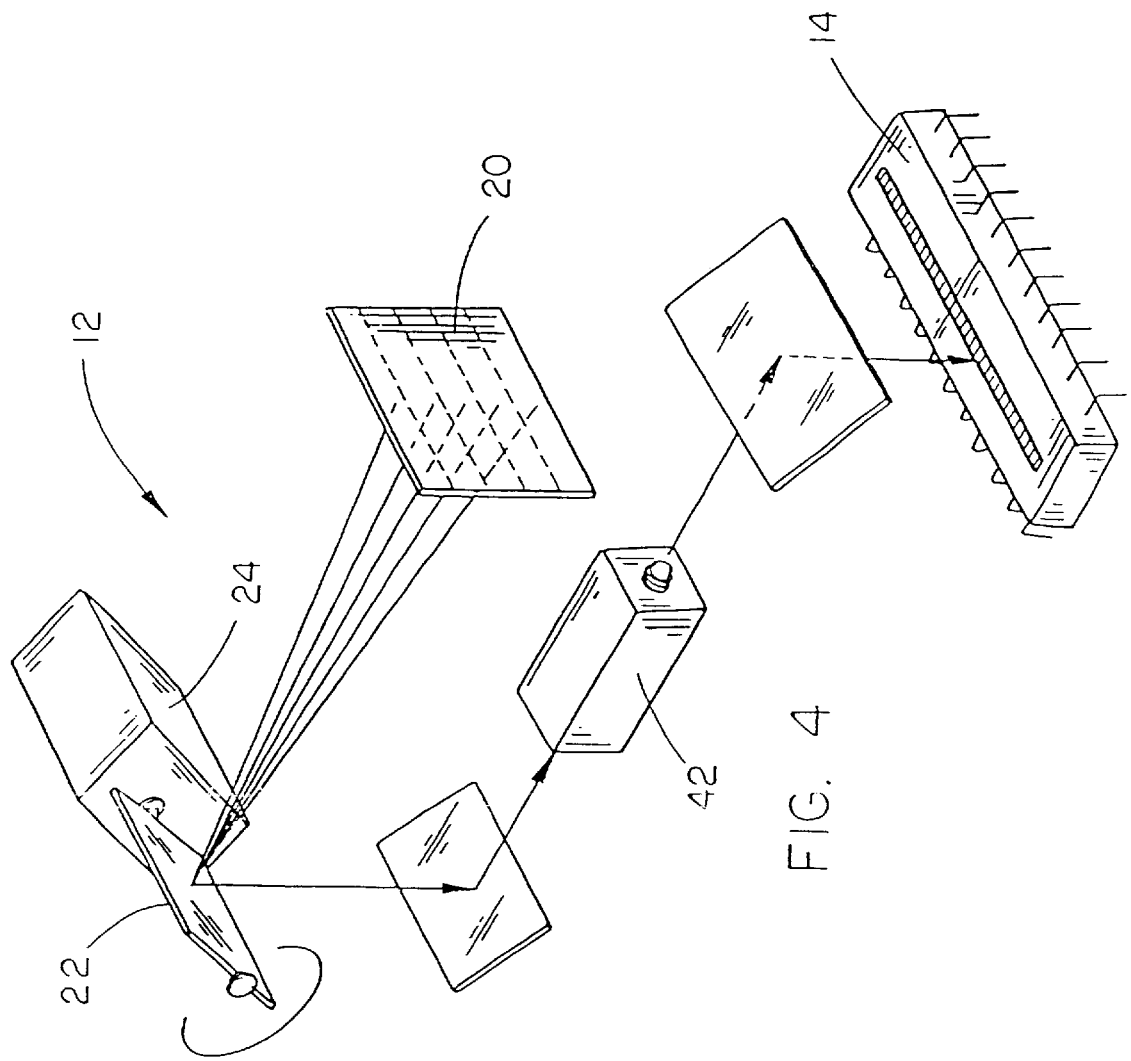
FIG. 4 is a highly diagrammatic perspective view of the image capturing elements of a linear array exemplary embodiment of the present invention.
Figure 5:
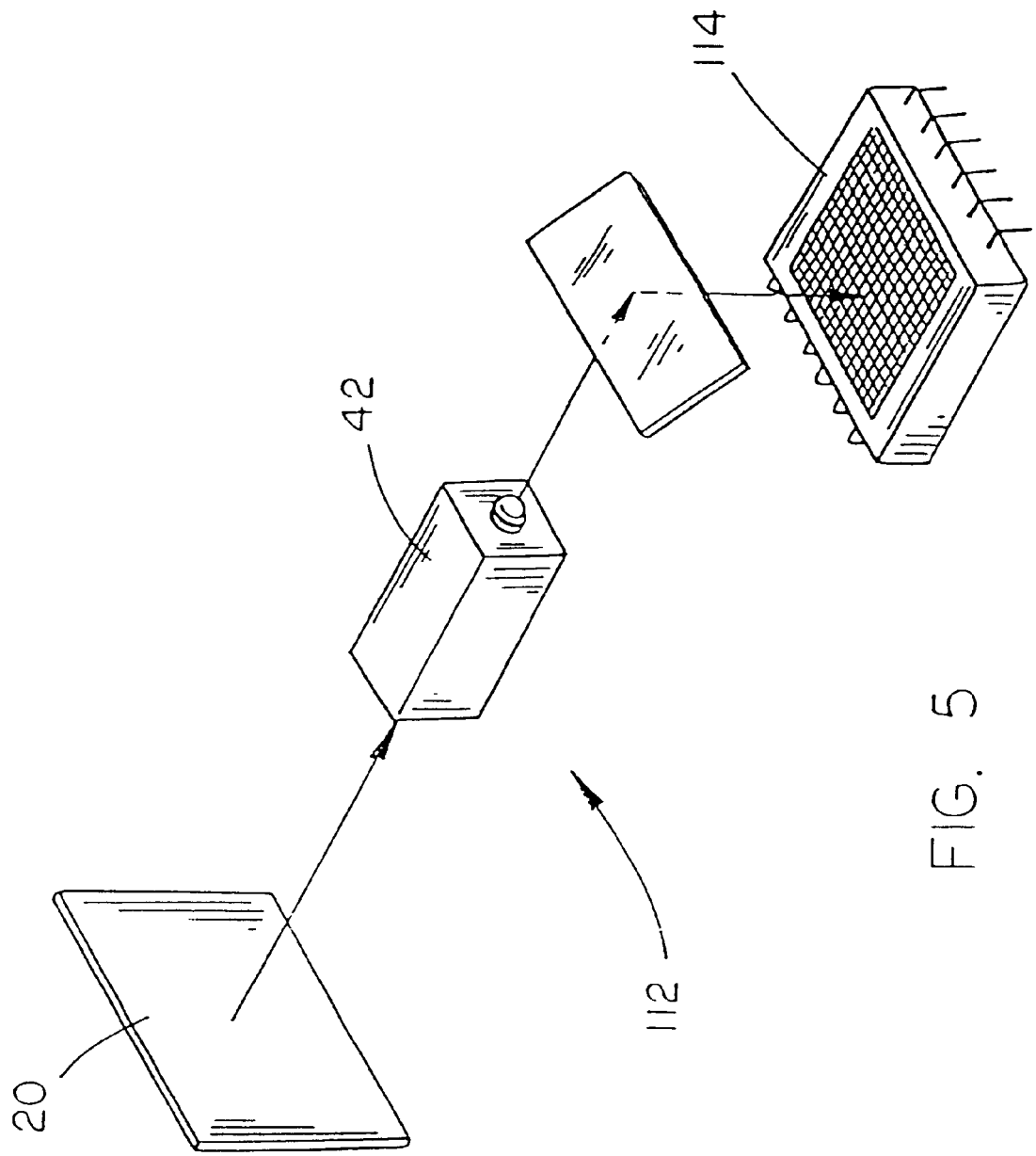
FIG. 5 is a highly diagrammatic perspective view of the image capturing elements of a two-dimensional array exemplary embodiment of the present invention.
Figure 6:
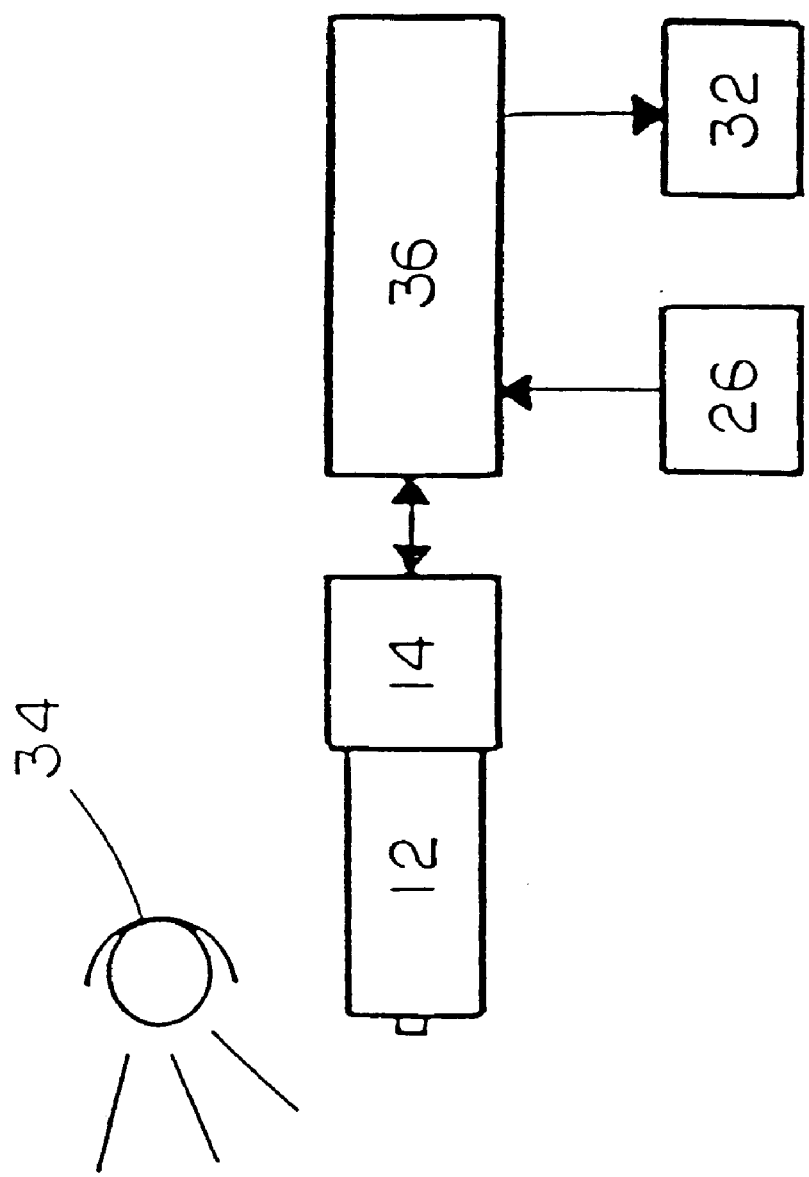
FIG. 6 is a block diagram illustrating the various components of the present invention.
Figure 7:
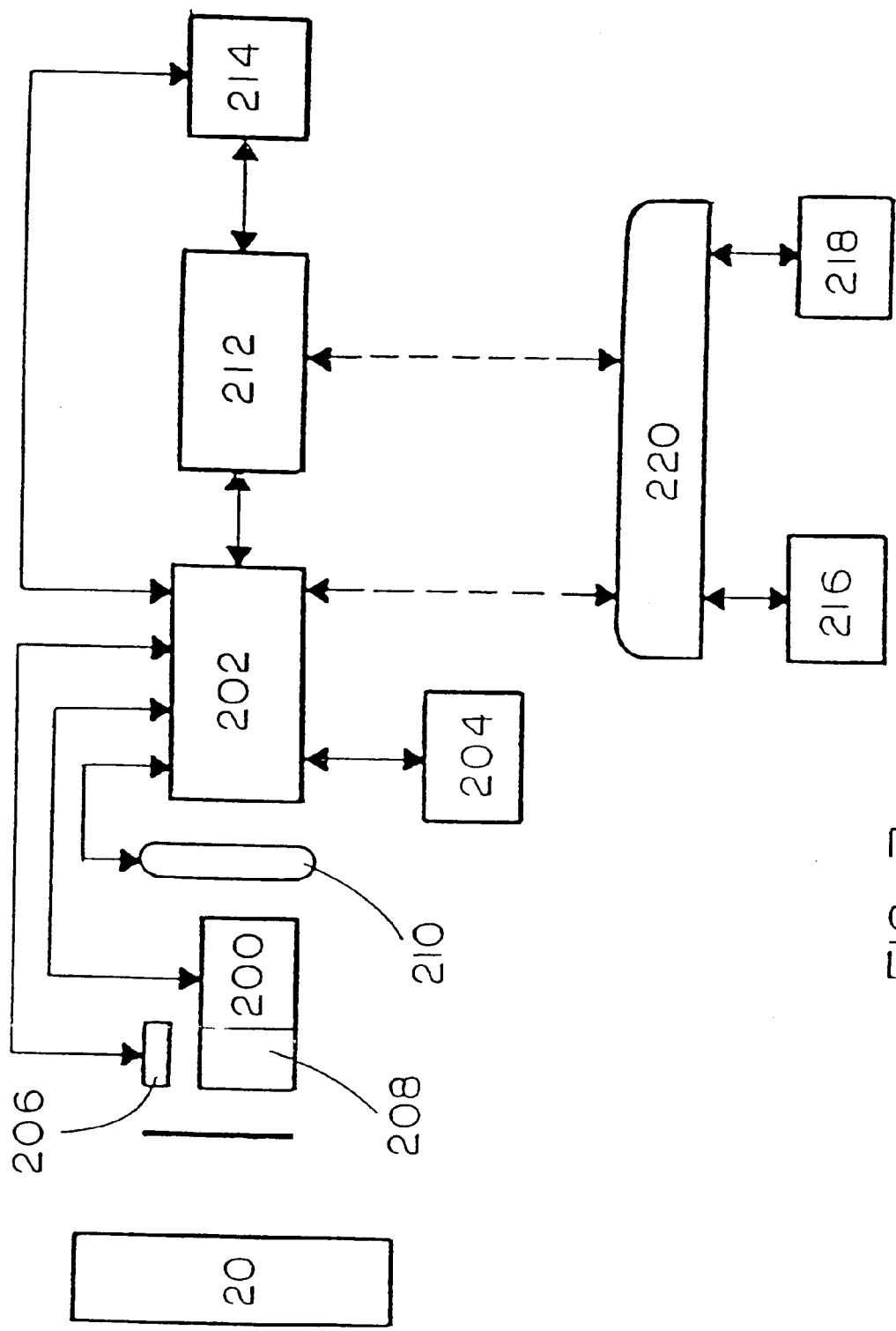
FIG. 7 is a more detailed diagram illustrating the various components of the present invention.

The detailed description of FIGS. 1–7 as found in U.S. Pat. No. 5,902,988 from col. 2, line 63, to col. 7, line 67, is hereby incorporated herein by reference in its entirety.

The detailed description and drawings of U.S. Pat. No. 5,821,523 are also incorporated herein by reference in their entirety as showing in further embodiments within the scope of the present invention.

Incorporation by Reference

The present invention may be construed for use in a docking type system for recharging/communicating with the apparatus disclosed herein. A docking station which might be adapted for use with the present invention is disclosed in U.S. application Ser. No. 07/451,322, filed Dec. 15, 1989, (now U.S. Pat. No. 5,227,614), which application is incorporated herein by reference in its entirety as illustrating arrangements which may be embodied in a peripheral shell 260 (FIG. 10; Ser. No. 07/451,322). Likewise, the disclosure of U.S. Pat. No. 4,877,949, issued Oct. 31, 1989, is also incorporated herein by reference, in its entirety, as illustrating means for focusing an image of optically readable information over a substantial range of distances. Also incorporated herein by reference is U.S. application Ser. No. 07/451,322, filed Dec. 15, 1989, (now U.S. Pat. No. 5,227,614) as illustrating a display 14 (FIGS. 13 and 14) adapted to assist a user of an apparatus in reading optically readable information. Finally, also incorporated in its entirety herein by reference is U.S. application Ser. No. 07/143,921, filed Jan. 14, 1988, as illustrating optically readable information digitizing and decoding means (FIGS. 7 through 18).

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved optical information reader which accomplishes at least all of the stated objects.

What is claimed is:

1. An apparatus for reading two-dimensional optical information, comprising:
   (a) a housing having an opening;
   (b) a photosensitive array mounted within said housing for capturing two-dimensional optical information;
   (c) an optical system associated with said array and said housing opening of said housing for focusing said optical information on said array;
   (d) a control for controlling said array and optical system;
   (e) a memory for storing output from said array;
   (f) an electrical power supply for providing power for the operation of said apparatus; and
   (g) a display for displaying an image of said optical information captured by said array.

2. An apparatus according to claim 1, including:
   a pattern recognition facility for assisting a user in recognizing optical information; and
   wherein said display is associated with said housing for displaying said image as processed by said pattern recognition facility, said display further including an optical information decodability indication.

3. An apparatus according to claim 2, including:
   user feedback providing user interface with said apparatus, for facilitating user control over said optical system, array and display.

4. The apparatus of claim 1, wherein said housing is of a size and shape suited for hand-held operation.

5. The apparatus of claim 1, wherein said photosensitive array is a one-dimensional array.

6. The apparatus of claim 5, wherein said optical system further comprises a device for rastering one-dimensional image segments of a two-dimensional image onto the photosensitive regions of said array.

7. The apparatus of claim 1, wherein said photosensitive array is a two-dimensional array.

8. The apparatus of claim 1, further comprising zoom system for changing the image height of an object on said array.

9. The apparatus of claim 1, further comprising focusing system for variably focusing the image of an object on said array.

10. The apparatus of claim 1, wherein said memory is volatile.

11. The apparatus of claim 1, wherein said pattern recognition facility and an optical information decoder includes parallel processors controlled at least in part by a fuzzy logic instruction set for both aiming and pattern recognition of likely optical information.

12. The apparatus of claim 1, wherein said optical system further comprises auto focus.

13. A process for reading two-dimensional optical information, comprising:
   (a) directing a reader at optical information to be read wherein said reader includes:
      1) a housing having an opening;
      2) a photosensitive array mounted within said housing for capturing two-dimensional optical information;
      3) an optical system associated with said array and said opening of said housing for focusing said optical information on said array;
      4) a control for controlling said array and optical system;
      5) a memory for storing output from said array;
      6) an electrical power supply for providing power for the operation of said apparatus;
      7) a decoder for decoding optical information; and
      8) a display for displaying an image of said optical information captured by said array;
   (b) displaying said image on said display; and
   (c) aiming said reader at an optical information set to be read at least partially with the aid of said image on said display.

14. The process of claim 13, wherein said housing is of a size and shape suited for hand-held operation.

15. The process of claim 13, wherein said photosensitive array is a one-dimensional array.

16. The process of claim 15, wherein said optical system further comprises a device for rastering one-dimensional image segments of a two-dimensional image onto the photosensitive regions of said array.

17. The process of claim 13, wherein said photosensitive array is a two-dimensional array.

18. The process of claim 13, further comprising zoom system for changing the image height of an object focused on said array.

19. The process of claim 14, further comprising a focusing system for variably focusing the image of an object on said array.

20. The process of claim 13, wherein said memory is volatile.

21. The process of claim 13, wherein said pattern recognition facility and optical information decoder includes parallel processors controlled at least in part by a fuzzy logic instruction set for both aiming and pattern recognition of likely optical information.

22. The process of claim 13, wherein said pattern recognition facility is comprised of a neural network.

23. The process of claim 13, wherein said optical system further comprises auto focus.

24. The process of claim 13, further comprising the step of subtracting any user hand jitter from the image displayed to the user.

25. The apparatus of claim 1, further comprising a system for limiting image jitter displayed on the display.

26. The process of claim 13, wherein, the apparatus includes: a pattern recognition facility for assisting a user in recognizing and confirming the decodability of optical information; and said display associated with said housing for displaying said image as processed by said pattern recognition facility, and said process includes, providing an optical information decodability indication on said display.

27. An apparatus for reading optical information, comprising:
   a photosensitive system for capturing optical information without requiring the apparatus to make contact with that optical information;
   an optical system associated with said photosensitive system for focusing said optical information on said photosensitive system;
   a power supply for providing power for the operation of said apparatus;
   a display coupled with said photosensitive system for displaying an image of said optical information captured by said photosensitive system; and
   a portable, hand-held housing supporting said photosensitive system, said optical system, said power supply and said display.

28. An apparatus according to claim 27, including:
   a pattern recognition facility for assisting a user in recognizing optical information; and
   wherein said display is associated with said pattern recognition facility for displaying said image as processed by said pattern recognition facility.

29. An apparatus according to claim 27, including:
   a user feedback providing user interface with said apparatus, for facilitating user control over said optical system and said display.

30. The apparatus of claim 27, wherein said apparatus is of a size and shape suited for hand-held operation.

31. The apparatus of claim 27, wherein said photosensitive system is a one-dimensional array of photosensitive regions.

32. The apparatus of claim 31, wherein said optical system further comprises a device for rastering one-dimensional image segments of a two-dimensional image onto the photosensitive regions of said one-dimensional array.

33. The apparatus of claim 27, wherein said photosensitive system is a two-dimensional array of photosensitive regions.

34. The apparatus of claim 27, further comprising a zoom system for changing the image height of an object on said photosensitive system.

35. The apparatus of claim 27, further comprising a focusing system for variably focusing the image of an object on said photosensitive system.

36. The apparatus of claim 27, wherein a memory is coupled with said photosensitive system for storing output therefrom.

37. The apparatus of claim 28, wherein said pattern recognition facility and an optical information decoder have a processor system controlled at least in part by a fuzzy logic instruction set for both aiming and pattern recognition of likely optical information.

38. The apparatus of claim 27, wherein said optical system further comprises an autofocus function.

39. A process for reading optical information, comprising:
   manually directing a reader at optical information to be read, wherein said reader includes: a photosensitive system for capturing optical information; an optical system associated with said photosensitive system for focusing said optical information on said photosensitive system; a decoder for decoding optical information; and a display coupled with said photosensitive system for displaying an image of said optical information captured by said photosensitive system;
   displaying an image of said optical information on said display; and
   aiming said reader at an optical information set to be read at least partially with the aid of said image on said display.

40. The process of claim 39, wherein said reader is of a size and shape suited for hand-held operation.

41. The process of claim 39, wherein said photosensitive system is a one-dimensional array of photosensitive regions.

42. The process of claim 41, further comprising rastering one-dimensional image segments of a two-dimensional image onto the photosensitive regions of said one-dimensional array.

43. The process of claim 39, wherein said photosensitive system comprises a two-dimensional array of photosensitive regions.

44. The process of claim 39, further comprising a reader with a zoom system the process further comprises changing the image height of an object focused on said photosensitive system by means of said zoon system.

45. The process of claim 39, the reader having a focusing system, and the process further comprising variably focusing the image of an object on said photosensitive system.

46. The process of claim 39, wherein said reader has a memory and the process further comprises storing the output from said photosensitive system.

47. The process of claim 39, wherein said reader includes a pattern recognition facility and an optical information decoder, said a processor system, and said process further comprises controlling least in part by a fuzzy logic instruction set of the processor system both aiming and pattern recognition of likely optical information.

48. The process of claim 39, wherein said reader comprises a pattern recognition facility comprised of a neural network.

49. The process of claim 39, wherein said process further comprises autofocus operation of said optical system.

50. The process of claim 39, further comprising the step of subtracting any user hand jitter from the image displayed to the user.

51. The apparatus of claim 27, further comprising a system for limiting image jitter displayed on the display.

52. The process of claim 39, wherein, the reader includes a pattern recognition facility for assisting a user in recognizing and confirming the decidability of optical information; said display associated with said reader for displaying said image as processed by said pattern recognition facility, and said process further includes providing an optical information decodability indication on said display.

* * * * *